United States Patent
Goyal et al.

(10) Patent No.: US 11,538,051 B2
(45) Date of Patent: Dec. 27, 2022

(54) MACHINE LEARNING-BASED GENERATION OF TARGET SEGMENTS

(71) Applicant: Adobe Inc., San Jose, CA (US)

(72) Inventors: Praveen Kumar Goyal, Noida (IN); Piyush Gupta, Noida (IN); Nikaash Puri, New Delhi (IN); Balaji Krishnamurthy, Noida (IN); Arun Kumar, Ghaziabad (IN); Atul Kumar Shrivastava, Noida (IN)

(73) Assignee: Adobe Inc., San Jose, CA (US)

( * ) Notice: Subject to any disclaimer, the term of this patent is extended or adjusted under 35 U.S.C. 154(b) by 215 days.

(21) Appl. No.: 16/168,288

(22) Filed: Oct. 23, 2018

(65) Prior Publication Data

US 2020/0126100 A1  Apr. 23, 2020

(51) Int. Cl.

| G06Q 30/02 | (2012.01) |
|---|---|
| G06N 7/00 | (2006.01) |
| H04N 21/442 | (2011.01) |
| H04N 21/81 | (2011.01) |
| G06N 20/00 | (2019.01) |
| G06F 16/28 | (2019.01) |

(52) U.S. Cl.
CPC ....... *G06Q 30/0204* (2013.01); *G06F 16/285* (2019.01); *G06N 7/005* (2013.01); *G06N 20/00* (2019.01); *H04N 21/44204* (2013.01); *H04N 21/812* (2013.01)

(58) Field of Classification Search
CPC .......... G06Q 30/0204; G06Q 30/0205; G06Q 30/0201; H04N 21/44204

USPC ........................................................ 705/7.33
See application file for complete search history.

(56) References Cited

U.S. PATENT DOCUMENTS

| 9,055,343 | B1 * | 6/2015 | Lewis | H04N 21/25 |
|---|---|---|---|---|
| 2003/0101451 | A1 * | 5/2003 | Bentolila | G06Q 30/0254 |
| | | | | 725/35 |
| 2009/0240677 | A1 * | 9/2009 | Parekh | G06F 16/9535 |
| | | | | 707/999.005 |
| 2011/0082824 | A1 * | 4/2011 | Allison | G06Q 10/10 |
| | | | | 706/46 |
| 2013/0097624 | A1 * | 4/2013 | Joh | H04N 21/4663 |
| | | | | 725/14 |

(Continued)

OTHER PUBLICATIONS

Generating personas from online social media data. Jisun An; 2018 (Year: 2018).*

*Primary Examiner* — Timothy Padot
*Assistant Examiner* — Francis Z. Santiago Merced
(74) *Attorney, Agent, or Firm* — FIG. 1 Patents

(57) ABSTRACT

Techniques are described for machine learning-based generation of target segments is leveraged in a digital medium environment. A segment targeting system generates training data to train a machine learning model to predict strength of correlation between a set of users and a defined demographic. Further, a machine learning model is trained with visit statistics for the users to predict the likelihood that the users will visit a particular digital content platform. Those users with the highest predicted correlation with the defined demographic and the highest likelihood to visit the digital content platform can be selected and placed within a target segment, and digital content targeted to the defined demographic can be delivered to users in the target segment.

20 Claims, 9 Drawing Sheets

(56) References Cited

U.S. PATENT DOCUMENTS

| | | | |
|---|---|---|---|
| 2014/0237496 A1* | 8/2014 | Julian | G06Q 30/02 |
| | | | 725/13 |
| 2016/0192006 A1* | 6/2016 | Alfishawi | H04N 21/44204 |
| | | | 725/32 |
| 2017/0011420 A1* | 1/2017 | Sullivan | G06N 20/00 |
| 2017/0118532 A1* | 4/2017 | Sullivan | G06Q 30/0201 |
| 2018/0082325 A1* | 3/2018 | Kitts | G06Q 30/0277 |
| 2018/0218394 A1* | 8/2018 | Kerns | G06Q 30/0251 |
| 2018/0262806 A1* | 9/2018 | Greene | H04N 21/84 |

* cited by examiner

MACHINE LEARNING-BASED GENERATION OF TARGET SEGMENTS

BACKGROUND

Digital analytics systems are implemented to analyze "big data" to gain insights that are not possible to obtain, solely, by human users. In one such example, digital analytics systems are configured to analyze big data to predict user attributes, which may support a wide variety of functionality. Prediction of user attributes, for instance, may be used to determine whether a user is likely to perform a certain action, to improve operational efficiency of devices to address unnecessary provision of events (e.g., to avoid unnecessary resource usage), resource allocation, and so forth.

In one particular example, prediction of user attributes may be used to manage provision of digital content and resource allocation by service provider systems and thus improve operation of devices and systems that leverage these predictions. Examples of techniques that leverage prediction of user attributes include digital content delivery systems, recommendation systems, digital marketing systems (e.g., to cause conversion of a good or service), systems that rely on a user propensity to consume certain types and instances of resources, and so forth. Thus, prediction of user attributes may be used by a wide variety of service provider systems for personalization, targeted content delivery, customer relation/success management (CRM/CSM), and so forth for a variety of different entities, e.g., devices and/or users.

Techniques used by conventional digital analytics systems to predict user attributes, however, are faced with numerous challenges that limit accuracy of the predictions as well as involve inefficient use of computational resources. One such challenge is the off-target delivery of digital content due to inaccurate predictions of user attributes. For example, certain instances of digital content are generated to be delivered to consumers that match a particular set of consumer attributes, known as a "demographic." A demographic generally represents a category of consumers with a particular defined set of attributes, such as a specific age range, gender identity, educational status, income status, and so forth.

In efforts to deliver an instance of digital content to consumers in a targeted demographic, digital content delivery systems utilize predictive models that attempt to predict consumer attributes and that categorize consumers into different demographics based on the predicted attributes. Using such predictive models, a digital content delivery system can endeavor to deliver digital content that is targeted to a particular demographic to consumers that are predicted to be in the targeted demographic. Predictive models used by conventional digital content delivery systems, however, exhibit a number of drawbacks and inaccuracies that result in high percentages of targeted digital content deliveries to consumers outside of a target demographic, i.e., "off-target deliveries." Such off-target deliveries waste computational resources across the digital content delivery pipeline, including the system resources that generate the inaccurate predictive models, system resources used to deliver to digital content, and system resources of the consumer used to present the digital content since the consumer is outside of the target demographic and is thus less likely to benefit from the targeted digital content.

To enable targeted digital content to be delivered to consumers in specific demographics, conventional digital content delivery systems attempt to identify exposure points where the targeted digital content can be successfully delivered to such consumers. By way of example, targeted digital content represents "supplemental" digital content that can be delivered supplementary to primary digital content. Primary digital content, for instance, represents digital content that can be delivered to a consumer based on an action by the consumer to access the primary digital content, such as a television show, a movie, a web page, streaming content, and so forth. Accordingly, supplemental digital content can be delivered in conjunction with delivery of primary digital content, such as in the form of advertisements for products and services, public service announcements, supplemental informational content related to instances of primary digital content, and so forth.

In some conventional scenarios, digital content delivery systems attempt to optimize delivery of supplemental digital content to consumers in a key demographic by delivering the supplemental digital content along with primary digital content that is estimated to have a high likelihood of being consumed by consumers in the key demographic. However, conventional digital content delivery systems typically identify such primary digital content based on data models generated using data from third party analysis of primary digital content viewing patterns. This third party data is very low on consumer attribute specificity (e.g., is based on small number of consumer attributes) and often has a high error rate in terms of consumer demographic placement. In some cases, this is due to faulty data collection strategies and/or incorrect assumptions about consumer attributes. For instance, errors can be introduced into this data due to human involvement in data gathering and data categorization. Thus, since the data used to generate such models is typically inaccurate in its assumptions, the models generated based on this data by conventional digital content delivery systems are typically unreliable and are unable to be validated since the input data lacks the requisite specificity to enable proper model validation. This often results in excessive delivery of supplemental digital content to consumers that are outside of a target demographic. Accordingly, a lack of accurate training data for training such models provides inaccurate data models that result in high percentages of off-target supplemental digital content delivery, thus wasting resources that are used for delivery of the supplemental digital content.

Another drawback to conventional predictive models that attempt to predict consumer attributes for targeted digital content delivery is that the predictive models typically fail to consider the likelihood that individual consumers will visit a particular digital content delivery platform at a future time. A digital content delivery platform, for example, represents a digital medium by which digital content is deliverable, such as a digital television station, an application, a digital content streaming service, a website, and so forth. As described above, a conventional predictive model may leverage a conventional predictive model to identify a segment of consumers that are more than likely within a target demographic. However, absent some indication of whether the segment of consumers will visit a particular digital content delivery platform at a future time, conventional systems are not able to predict with any level of certainty that the identified consumers will actually visit (e.g., view and/or consume in some way) the particular content delivery platform at some future time such that digital content targeted to the demographic can actually be delivered to consumers within the segment.

Thus, predictive models employed by conventional systems that simply predict that a segment of consumers are within a particular demographic do not provide an indication that an opportunity to deliver targeted digital content to the consumers will indeed occur, e.g., via user presence at a suitable digital content delivery platform. Without this, a digital content delivery system may simply deliver targeted digital content in conjunction with primary digital content that is identified by a conventional predictive model as being correlated with a target demographic. As explained above, however, such conventional predictive models are typically generated using faulty data sets, and thus often present an unreliable indication of whether the individuals consuming an instance of primary digital content at a particular time are actually within a target demographic. As a result of the aforementioned challenges, conventional ways for delivering targeted digital content typically result in high percentages of off-target digital content delivery, thus wasting computational and network resources across a digital content delivery pipeline.

SUMMARY

Machine learning-based generation of target segments is leveraged in a digital medium environment. To mitigate the problem of a lack of training data for training a machine learning model to estimate user-demographic correlation, a segment targeting system is employed to generate training data by segmenting users based on content viewing patterns, obtaining demographic placement information for individual user segments, and inferring user-demographic correlation ("on-target ratios") for individual users based on the demographic placement information. The on-target ratios are used to train a machine learning model to predict strength of correlation between a set of users and a defined demographic. Further, a machine learning model is trained with visit statistics for the users to predict the likelihood that the users will visit a particular digital content platform. Those users with the highest predicted correlation with the defined demographic and the highest likelihood to visit the digital content platform can be selected and placed within a target segment. The target segment can then be used to deliver digital content targeted to the defined demographic to users in the target segment and via the digital content platform to optimize the likelihood of on-target delivery of the targeted digital content. Thus, machine learning-based generation of target segments enables digital content to be focused on a targeted demographic and reduces the inefficiencies present in conventional digital content delivery systems.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
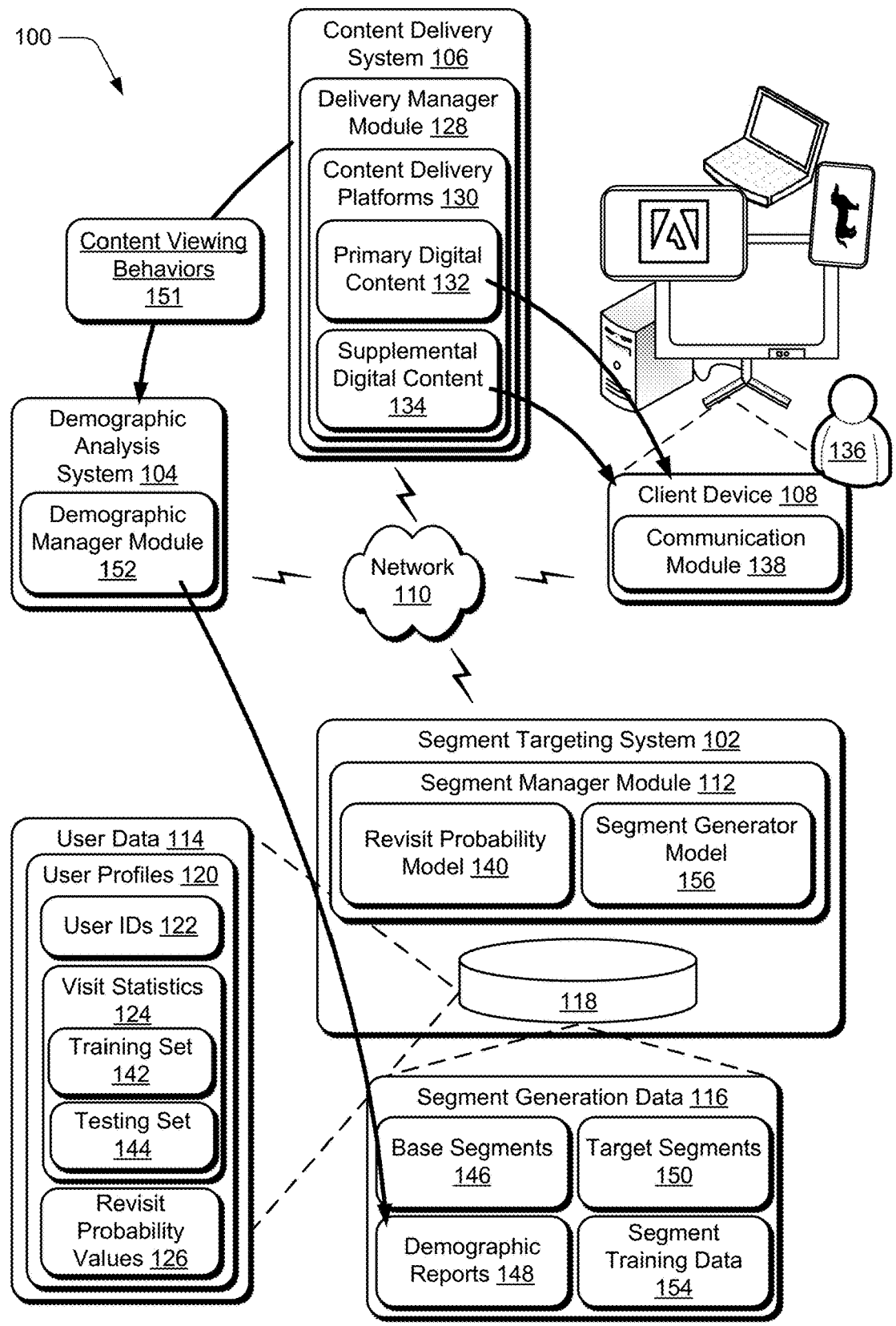
FIG. 1 is an illustration of an environment in an example implementation that is operable to employ techniques described herein.

Prediction of user attributes may be used to support a wide range of functionality by service provider systems as described above, examples of which include control of digital content delivery systems, control of targeted digital content to be delivered to users, and so forth. Conventional techniques and systems to predict user attributes for targeted digital content delivery, however, have limited accuracy due to the numerous challenges faced by these systems, including inaccuracies in data used to generate predictive models, and the inability to predict whether users will visit a digital content delivery platform such that targeted digital content can be successfully delivered. Accordingly, digital content delivery systems that employ these conventional techniques are confronted with inefficient use of computational and network resources used to attempt to predict user attributes, and to deliver targeted digital content to users.

For example, a lack of accuracy in predicting user attributes involving computational resource usage by a digital content delivery system may result in errant delivery of targeted digital content to users outside of a target demographic (i.e., excess "off-target" deliveries), and failure to deliver the targeted digital content to sufficient users within the target demographic, i.e., too few "on-target" deliveries. This may result in repeated attempts to deliver targeted digital content to users within a targeted demographic, thus wasting computational and network resources used to deliver the targeted digital content.

Conventional digital content delivery systems attempt to optimize on-target deliveries in different ways, such as by targeting digital content delivery based on estimated content-demographic correlations, via predictive models generated leveraging user segments generated by third parties, and so forth. However, such conventional digital content delivery systems are inefficient and are unable to provide accurate targeting data for delivering targeted digital content. For instance, systems that use content-demographic correlations typically operate by targeting supplemental content to primary content that is estimated to have a significant viewership in a target demographic. This viewership-demographic correlation is typically estimated based on third party demographic analyses that attempt to determine a relative percentage of users that consume a particular instance of primary content that match a particular target demographic.

Such content-based demographic analyses, however, simply provide a general characterization of an audience as a whole, e.g., "45% of consumers that viewed Content A are estimated to match demographic category B." Thus, demographic targeting information for individual consumers is not known, but rather only for large groups of consumers. Accordingly, predictive models generated by such conventional digital content delivery systems will typically result in highly inaccurate predictions of user-demographic correlations since group-based estimations of demographic correlations are not usable to train a model (e.g., a machine learning model) to accurately predict demographic correlations for individual users.

To overcome these challenges, machine learning-based generation of target segments is leveraged in a digital medium environment. For instance, to mitigate the challenge of a lack of training data for training a machine learning model to estimate user-demographic correlation, the described segment targeting system generates training data by segmenting users based on content viewing patterns to generate different user segments, obtaining demographic placement information for the individual user segments, and inferring user-demographic correlation ("on-target ratios") for individual users based on the demographic placement information. The on-target ratios are used to train a machine learning model, and the machine learning model is leveraged to predict strength of correlation between a set of users and a defined demographic. Those users with the highest predicted correlation with the defined demographic can be selected and placed within a target segment, and digital content targeted to the defined demographic can be delivered to users in the target segment. Thus, machine learning-based generation of target segments enables content to be focused on a targeted demographic and reduces the inefficiencies present in conventional digital content delivery systems.

Furthermore, challenges pertaining to predicting whether users will visit a particular digital content platform such that supplemental digital content can be successfully delivered are addressed by the techniques disclosed herein. For instance, in an example implementation, a segment targeting system processes user data based on visit statistics for user profiles in the user data, and determines, based on the visit statistics, probabilities that different users will revisit a particular digital content delivery platform. The visit statistics, for instance, represent data describing user behaviors in relation to the particular digital content delivery platform, such as how frequently a user visits the digital content delivery platform, a duration of user visits to the platform, and so forth. A training set of the visit statistics is used to train a revisit probability machine learning model, referred to hereafter as a "revisit probability model." After the revisit probability model is trained, a testing set of the visit statistics is input into the trained revisit probability model, which outputs revisit probabilities that indicate, for each user identified in the user profiles, a probability that the user will revisit the content delivery platform at a future time. As further described below, the revisit probability values can be used in generating segments of users, and in selecting users to place into a target segment.

The segment targeting system then uses the visit statistics to generate different user segments by placing the user profiles into different base segments based on similarity of visit statistics. For instance, the visit statistics identify different instances of primary digital content that each user has consumed over a particular period of time. Generally, primary digital content represents content that can be delivered to a user based on an intentional action by the user to access the primary digital content. A user, for example, can initiate playback of primary digital content via interaction with a client device to access an application or service that publishes the primary digital content. Examples of the primary digital content include a television show, a movie, a web page, content presented via an application, streaming content (e.g., video and/or audio), downloadable content, and combinations thereof. Accordingly, those users that are determined to view similar instances of primary digital content are placed into common segments to generate different base segments of users that are each associated with common respective content consumption behaviors.

Further to techniques for machine learning-based generation of target segments, the segment targeting system obtains demographic reports that describe a ratio of users in each of the base segments that are estimated to belong to a target demographic. As further described below, the demographic reports are used to generate training data for training a machine learning model to generate target segments of users. In an example implementation, to obtain the demographic reports, the segment targeting system submits segment identifiers for the base segments to a demographic analysis system. Generally, the demographic analysis system is configured to correlate content consumption behaviors to particular demographics, and generate the demographic reports based on the content consumption behaviors.

To enable the demographic reports to be generated, the demographic analysis system maintains demographic data that indicates percentages of users in different demographics that consume different instances of content. For instance, the demographic analysis system determines that for a particular instance of primary digital content, 55% of the users that consume the instance of primary digital content are predicted to match a particular demographic category. Accordingly, to enable the demographic analysis system to generate a demographic report for a particular base segment, the segment targeting system notifies the demographic analysis system when a user in a particular base segment consumes an instance of primary digital content. The segment targeting system, for example, communicates to the demographic analysis system a segment identifier for a base segment of the user, and a content identifier for the instance of primary digital content. This process occurs for multiple users in the base segment such that the demographic analysis system is notified of content consumption behaviors for multiple different users in the base segment. Accordingly, by correlating known demographic attributes of consumers of the instance of primary digital content to a number of users in the base segment that are detected as consuming the instance of primary digital content, the demographic analysis system can generate a demographic report indicating an estimated percentage ("segment target ratios") of users in the base segment that match a particular demographic.

The segment targeting system then uses the demographic report to generate training data for training a machine learning model to generate target probability data indicating a probability that individual users match the particular demographic. For instance, the segment targeting system maps segment target ratios for base segments identified in the demographic report to individual user identifiers that are placed in the respective base segments. This provides the segment targeting system with estimated on-target ratios for each of the user. The user on-target ratios are then used as training data to train a segment generator machine learning model, referred to hereafter as a "segment generator model." As further detailed below, instances of the training data can be weighted to reduce the effect of noise in the data that may be introduced based on imprecision in translating data from the demographic reports into the user on-target ratios. After the segment generator model is trained, user visit statistics are input into the trained segment generator model to output target probability data indicating a probability that each user matches the particular demographic.

To generate a focused target segment of users, users identified in the target probability data are sorted in order of decreasing probability of matching the particular demographic, and a set of users with the highest probabilities is selected to generate the target segment. For instance, consider that a particular advertising campaign has a specific delivery count that indicates a number of consumers to which the campaign is to be delivered. Accordingly, users with the highest probabilities of matching the particular demographic can be selected until a sum of the selected users' revisit probabilities (as calculated previously) is equal to the specified delivery count. The selected users are then stored as part of the target segment and the target segment is leveraged to deliver supplemental content to users identified as part of the target segment. The segment targeting system, for example, communicates the target segment to a digital content delivery system which utilizes a digital content delivery platform to deliver digital content (e.g., supplemental content such as advertisements) to users identified in the target segment. This greatly increases the probability that the advertising campaign will be delivered to users that match the particular demographic as compared with conventional digital advertising systems.

Accordingly, techniques for machine learning-based generation of target segments overcome the deficiencies of traditional ways for predicting user attributes for targeted digital content delivery. For instance, the innovative techniques are capable of creating accurate predictive models for predicting user attributes (e.g., user demographic traits) by generating model training data that is fine-tuned using demographic verification of initial user demographic correlations. Further, a revisit probability model is leveraged to enable those users predicted to be in a target demographic to be filtered to further identify those users who are predicted to visit a particular digital content delivery platform. In this way, accurate prediction of user demographic attributes and user content consumption behaviors can be leveraged to reduce resource wastage experienced in conventional digital content delivery systems.

Term Descriptions

These term descriptions are provided for purposes of example only and are not intended to be construed as limiting on the scope of the claims.

As used herein, the term "demographic" refers to a category of users defined based on different user attributes, such as age, gender, educational status, income level, marital status, occupation, and so forth. For instance, different demographics can be defined that each correspond to different sets of user attributes such that a particular user can be categorized into a demographic based on attributes of the user matching attributes used to define the demographic.

The term "on-target ratio" refers to a ratio of users in a segment that are estimated to match a particular demographic category, and/or a ratio that describes the probability that an individual user matches the particular demographic. With reference to users in a segment, an on-target ratio may indicate an estimated percentage of aggregate users in the segment that match the particular demographic category without estimating the probability that any individual user in the segment matches the particular demographic. With reference to an individual user, an on-target ratio may indicate an individual probability that the user matches a particular demographic.

The term "visit statistics" refers to data that describes attributes of user interaction with content and content delivery platforms. Examples of visit statistics include identifiers for instances of content that a user consumes, a number of times that a user visits a particular content delivery platform, durations of user visits to the particular content delivery platform, and so forth.

The term "revisit probability" refers to data that indicates a probability that a user will revisit in the future a content delivery platform that the user has previously visited. Revisit probability, for example, is calculated based on past user interaction with a content delivery platform, such as based on visit statistics that indicate a number of visits and visit durations for the content delivery platform.

The term "base segments" refers to groups of users that are clustered based on similarities in their content consumption behaviors. For instance, viewers that are determined to consume the same or similar instances of content are clustered into the same base segments. Base segments are then used to generate training data for training machine learning models to predict demographic attributes of individual users.

The term "target segment" refers to a focused set of users that is generated based on users from the base segments that are calculated to have the high probability of matching a particular demographic. A target segment, for example, is generated based on output from a machine learning model that processes individual user data (e.g., visit statistics for individual users) to predict demographic on-target probability for individual users.

In the following discussion, an example environment is first described that may employ the techniques described herein. Example implementation scenarios and procedures are then described which may be performed in the example environment as well as other environments. Performance of the example procedures is not limited to the example environment and the example environment is not limited to performance of the example procedures. Finally, an example system and device are described that are representative of one or more computing systems and/or devices that may implement the various techniques described herein.

Example Environment

FIG. 1 is an illustration of an environment 100 in an example implementation that is operable to employ machine learning-based generation of target segments as described herein. The illustrated environment 100 includes a segment targeting system 102, a demographic analysis system 104, a content delivery system 106, and a client device 108 that are communicatively coupled, one to another, via a network 110.

Computing devices that are usable to implement the segment targeting system 102, the demographic analysis system 104, the content delivery system 106, and the client device 108 may be configured in a variety of ways. A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 9.

The segment targeting system 102 includes a segment manager module 112 that is representative of functionality to generate targeted segments of users to which various types of content can be delivered further to techniques for machine learning-based generation of target segments described herein. To enable such targeted segments to be generated, the segment targeting system 102 maintains user data 114 and segment generation data 116 in a storage 118. The user data 114 generally represents various user attributes including user profiles 120 that include user identifiers ("IDs") 122, visit statistics 124, and revisit probability values 126 for large sets of users. The user IDs 122 represent data that is used to differentiate different users and to track behaviors of different users. The user IDs 122 may be implemented in various ways, such as a unique user ID (UUID), a user login name, a user email address, or a machine identifier, to name just a few.

The visit statistics 124 represent data that indicates various content consumption statistics and patterns for users identified in the user profiles 120. Consider, for example, that the content delivery system 106 includes a delivery manager module 128 that implements and exposes content delivery platforms 130. The content delivery platforms 130 represent different mediums by which content can be exposed, such as websites, network-accessible applications, content streaming services, television stations, radio stations, and so forth. The content delivery platforms 130 are leveraged by the delivery manager module 128 to deliver primary digital content 132 and supplemental digital content 134. The primary digital content 132 represents content that can be delivered to a user based on an intentional action by the user to consume the primary digital content 132. Examples of the primary digital content 132 include a television show, a movie, a web page, content presented via an application, streaming content (e.g., video and/or audio), downloadable content, and combinations thereof.

The supplemental digital content 134 represents content that can be delivered to a user supplementary to and/or separately from the primary digital content 132. In some cases, the supplemental digital content 134 represents content that a user may not intentionally initiate consumption of, but that may be presented to the user automatically based on user consumption of the primary digital content 132. Examples of the supplemental digital content 134 include advertisements for products and services, public service announcements, informational content related to instances of the primary digital content 132, and so forth.

Returning to discussion of the visit statistics 124, consider that a user 136 of the client device 108 leverages a communication module 138 to interact with a particular content delivery platform 130 and to consume an instance of the primary digital content 132. The communication module 138 generally represents functionality for presenting content on the client device 108, such as the primary digital content 132 and the supplemental digital content 134. Examples of the communication module 138 include a web browser, a network-enabled application, a television receiver, and so on, that can obtain content data from the content delivery system 106 via the network 110, and output the primary digital content 132 and the supplemental digital content 134 via the client device 108. Accordingly, when primary digital content 132 is delivered to the client device 108, the visit statistics 124 can be utilized to track and store information that describes the user's interaction with the content delivery platform 130, such as an identifier for an instance of the primary digital content 132, a time and date of the user interaction, a duration of the user interaction, and so forth. Thus, the visit statistics 124 for a user profile 120 of the user 136 can describe various content consumption patterns for the user 136 over time and, as discussed in detail below, can be used to target specific instances of the supplemental digital content 134 to the user 136.

The visit statistics 124, for example, can be utilized to generate the revisit probability values 126 which indicate a probability that particular users identified in the user data 114 will revisit particular content delivery platforms 130. In at least one implementation, the segment manager module 112 leverages a revisit probability model 140 to generate the revisit probability values 126. The revisit probability model 140 represents a machine learning model that is trained using a training data set ("training set") 142 of the visit statistics 124. After training, a testing data set ("testing set") 144 of the visit statistics 124 can be processed by the revisit probability model 140 to generate the revisit probability values 126. As further detailed below, the revisit probability values 126 are usable to separate the user profiles 120 into different segments and to generate targeted segments from the segments of users.

To enable the user data 114 to be used to generate targeted segments of users, the segment manager module 112 leverages the segment generation data 116, which includes base segments 146, demographic reports 148, and target segments 150. The base segments 146, for instance, are generated by taking large groups of users from the user data 114 and categorizing the users into different base segments 146 based on their respective visit statistics 124. As further detailed below, the revisit probability values 126 can be utilized to configure the segment size (e.g., the number of users) for the base segments 146. Thus, each of the base segments 146 represent users that have similar visit statistics 124, e.g., that are observed to have similar content viewing behaviors. Content viewing behaviors, for instance, are based on instances of digital content consumed by users, such as instances of the primary digital content 132.

The demographic reports 148 represent data that indicates demographic attributes of the base segments 146. For example, the demographic reports 148 identify different individual base segments 146 and particular demographic attributes of each of the individual base segments 146, such as percentages of users in the individual base segments 146 that are identified with particular demographic categories. A particular demographic report 148, for instance, may specify that N % of users (e.g., 45%, 60%, 75%, and so forth) in a particular base segment 146 are identified as corresponding to a particular demographic category that has a specific set of demographic attributes.

In at least some implementations, the segment targeting system 102 obtains the demographic reports 148 from the demographic analysis system 104 and based on content viewing behaviors 151 observed by the demographic analysis system 104. Examples of the demographic analysis system 104 include different 3rd party demographic systems such as Nielsen® (e.g., Nielsen Digital Ad Ratings), comScore®, Quantcast®, and so forth. In this example, the demographic analysis system 104 includes a demographic manager module 152, which is representative of functionality to determine demographic attributes of groups of users that consume content via the content delivery platforms 130. To enable demographic reports 148 to be generated for the base segments 146, the segment targeting system 102 provides identifiers for the base segments 146 to the demographic analysis system 104. The demographic manager module 152 determines demographic attributes of the base segments 146 based on content delivered to users in the base segments 146, and compiles the demographic reports 148 based on these attributes. The demographic manager module 152 then provides the demographic reports 148 to the segment targeting system 102. A more detailed discussion of how the demographic reports 148 are generated is presented below in the scenario 400.

According to techniques for machine learning-based generation of target segments, the segment targeting system 102 uses the demographic reports 148 to generate segment training data 154 for training a segment generator model 156 to generate the target segments 150. After the segment generator model 156 is trained with the segment training data 154, the segment generator model 156 is then usable to process the user profiles 120 and generate probabilities that each of the user profiles 120 correspond to a particular demographic category. Those user profiles 120 with the highest probabilities of matching a particular demographic category can be placed within target segments 150 that are targeted to the particular demographic category. The target segments 150 can then be used to provide targeted delivery of content, such as the supplemental digital content 134.

For instance, consider that the segment targeting system 102 provides the content delivery system 106 with a target segment 150 that corresponds to a particular demographic category, and the user 136 is identified as part of the target segment 150. Further, a particular instance of the supplemental digital content 134 (e.g., an advertisement) is identified as being targeted to the particular demographic category. Accordingly, the delivery manager module 128 can deliver the instance of the supplemental digital content 134 to the user 136. For example, when the delivery manager module 128 determines that the client device 108 is outputting an instance of primary digital content 132, the instance of the supplemental digital content 134 can be delivered to the client device 108 supplementary to the primary digital content 132. Accordingly, by generating and implementing the target segments 150, the probability that the supplemental digital content 134 will be delivered to an intended audience is greatly increased.

According to implementations for machine learning-based generation of target segments, the segment manager module 112 can configure the revisit probability model 140 and the segment generator model 156 using any type of machine-learning technique to enable prediction of revisit probabilities and target segments as described herein. Further, such a machine-learning model uses one or more of supervised learning, unsupervised learning, or reinforcement learning. For example, the machine-learning model can include, but is not limited to, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, or combinations thereof. In one particular implementation, a random forest regressor model is leveraged to reduce the effect of noise that may be present in training data used to train the revisit probability model 140 and the segment generator model 156. The segment manager module 112 may use machine-learning techniques to iteratively train and update the revisit probability model 140 and the segment generator model 156 to accurately predict user behaviors and provide increasingly focused and accurate target segments 150.

Having considered an example environment, consider now a discussion of some example details of the techniques for machine learning-based generation of target segments in a digital medium environment in accordance with one or more implementations.

Figure 2:
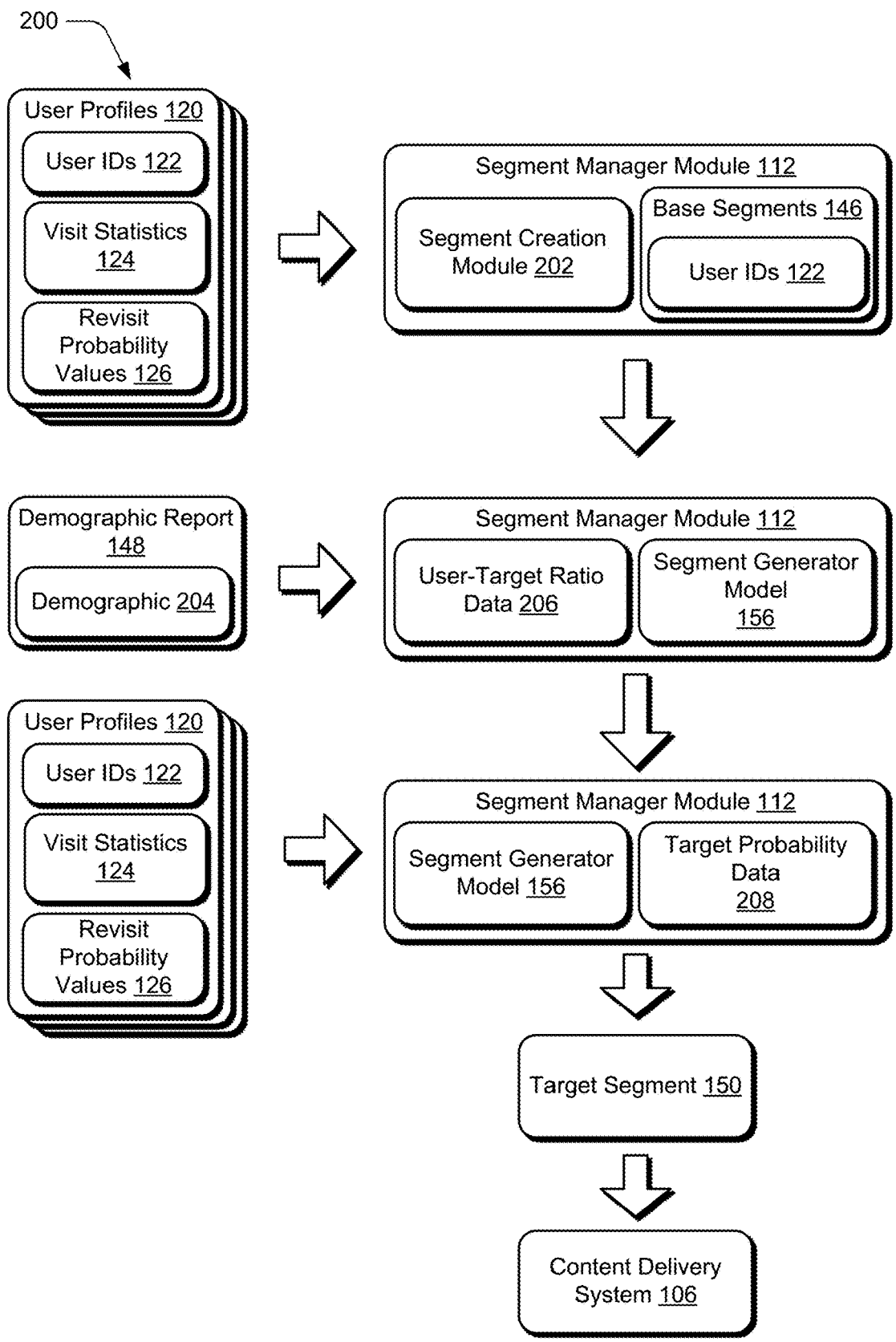
FIG. 2 depicts an example implementation scenario that represents an overview of processes for machine learning-based generation of target segments.

Implementation Scenarios for Machine Learning-Based Generation of Target Segments FIG. 2 depicts an example implementation scenario 200 that represents an overview of processes for machine learning-based generation of target segments in accordance with various implementations. More detailed discussions of individual aspects of the scenario 200 are presented after discussion of the scenario 200. In the scenario 200, the segment manager module 112 processes the user profiles 120 to generate the base segments 146 based on the visit statistics 124 and the revisit probability values 126. One example way for generating the revisit probability values 126 is detailed below with reference to FIG. 3.

To generate the base segments 146, the segment manager module 112 implements a segment creation module 202, which is representative of functionality to cluster the user profiles 120 based on similarity of their respective visit statistics 124. For example, the segment creation module 202 clusters the user profiles 120 based on common viewership of instances of the primary digital content 132 over a specified period of time. In such an implementation, each base segment 146 will be populated with user profiles 120 for users that view similar and/or identical instances of the primary digital content 132 over the specified period of time. One example way for clustering the user profiles 120 into the base segments 146 is detailed below with reference to FIG. 8. As illustrated in the scenario 200, each of the base segments 146 includes user IDs 122 for user profiles 120 of users that are clustered into the base segments 146.

After the base segments 146 are generated, a demographic report 148 is obtained for the base segments 146. The demographic report 148, for instance, is obtained via interaction between the segment targeting system 102 and the demographic analysis system 104. One example way of obtaining the demographic report 148 is detailed below with reference to FIG. 4.

Generally, the demographic report 148 indicates an estimated percentage of users in each of the base segments 146 that are identified as corresponding to a demographic category ("demographic") 204, i.e., an on-target percentage value for the demographic 204. Based on the demographic report 148, the segment manager module 112 generates user-target ratio data 206 that indicates a likelihood that each user profile 120 corresponds to the demographic 204 used to generate the demographic report 148. For instance, as part of the user-target ratio data 206, each user profile 120 in each base segment 146 is assigned an on-target ratio value based on the on-target percentage value for a respective base segment 146 in which the user profile 120 is placed.

Further to the scenario 200, the segment generator model 156 is trained using the user-target ratio data 206 and the user profiles 120 are input into the trained segment generator model 156 to generate target probability data 208. The target probability data 208 indicates a relative probability that each of the user profiles 120 is associated with a user that matches the demographic 204. As further detailed below, the user-target ratio data 206 is weighted prior to being input to the segment generator model 156 to reduce prediction errors that may occur due to inaccuracies in the on-target percentage values of the user-target ratio data 206.

The target probability data 208 is then filtered to generate the target segment 150, which represents those user profiles 120 that are determined to be most likely to match the demographic 204. For instance, consider that the target probability data 208 is sorted in descending order of decreasing probability of matching the demographic 204. Further, a particular delivery campaign for an instance of the supplemental digital content 134 has a target audience count of at users. Accordingly, the top at user profiles 120 are selected from the sorted target probability data 208 and used to generate the target segment 150. As further detailed below with reference to FIG. 5, in at least some implementations the target probability data 208 can be segmented and validated using the demographic analysis system 104 prior to generating the target segment 150.

After the target segment 150 is generated, the target segment 150 is then delivered to the content delivery system 106, which can use the target segment 150 to deliver instances of the supplemental digital content 134. For example, with reference to the delivery campaign specified in the previous paragraph, the instance of the supplemental digital content 134 can be delivered to users identified in the target segment 150. The instance of supplemental digital content 134 can be delivered in various ways, such as inserted into an instance of the primary digital content 132 and/or separately from the primary digital content 132. The following scenarios now describe different aspects of the scenario 200 in more detail.

Figure 3:
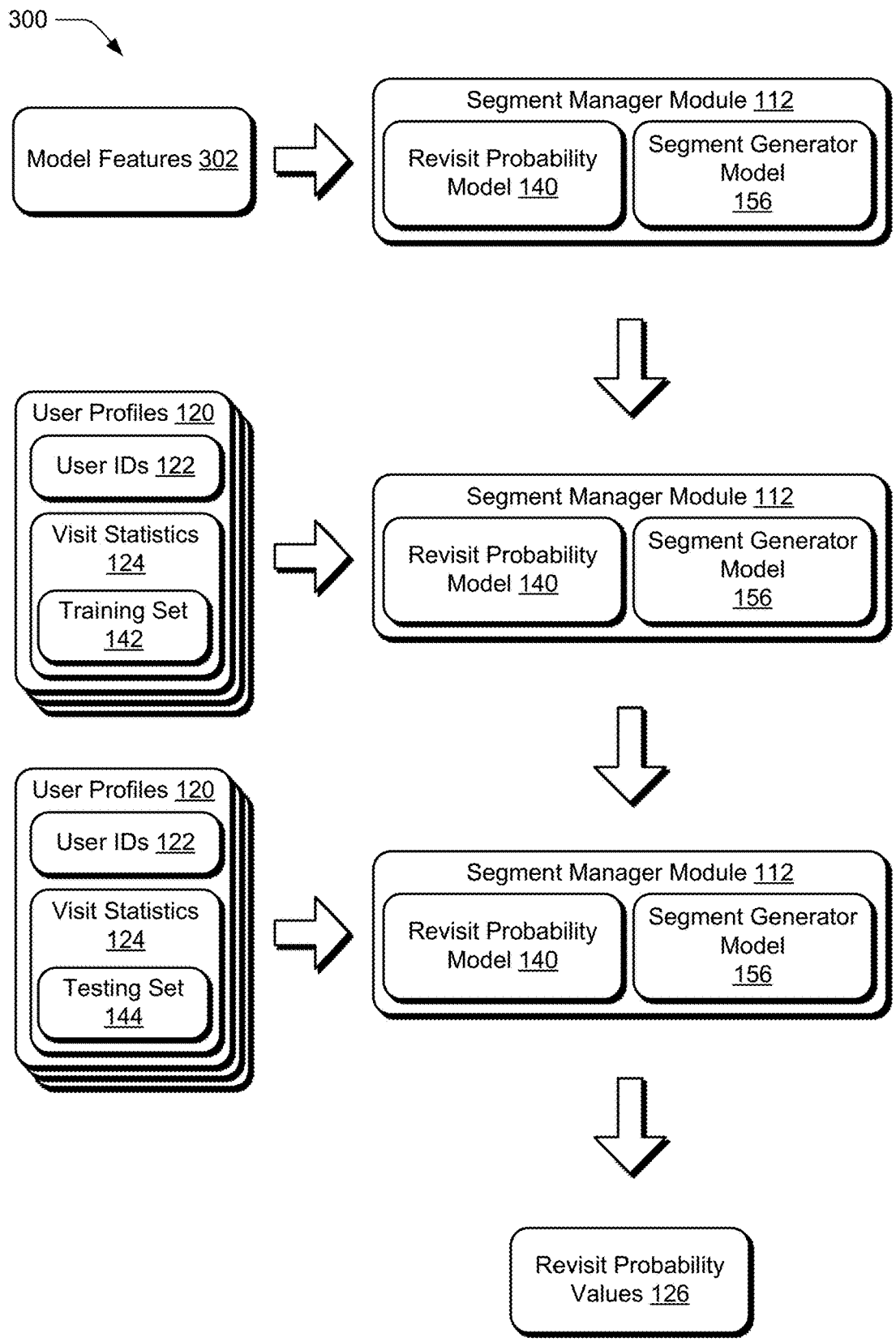
FIG. 3 depicts an example implementation scenario that describes a detailed way for generating revisit probability values.

FIG. 3 depicts an example implementation scenario 300 that describes a detailed way for generating the revisit probability values 126 that are usable to provide an indication of whether particular users will visit a particular content delivery platform. Initially, the revisit probability model 140 is configured with a set of model features 302. The model features 302 represent variables that the revisit probability model 140 is configured to evaluate to generate output. In this particular example, the model features 302 include:

(1) last_visit: This feature indicates a length of time that has elapsed since a user last visited a particular content delivery platform 130. This feature can be specified in any suitable time increment, such as hours, days, weeks, and so forth.

(2) video_start_in_last_t1: This feature represents a sum of content durations for content consumed on the particular content delivery platform 130 by a user over a time period $t_1$. Generally, $t_1$ can be configured as any suitable period of time, such as a month, a 2-week period, 1 week, and so forth. For instance, if $t_1$ is defined as a one month period, and a user watches 4.5 hours of video on the particular content delivery platform 130 over $t_1$, the value for video_start_in_last_$t_1$ is 4.5 hours.

(3) video_start_in_last_t1-n: This feature represents a sum of content durations for content consumed on the particular content delivery platform 130 by a user over a time period $t_{1-n}$, where n represents any positive integer. Generally, $t_{1-n}$ can be configured as any suitable period of time, such as a month, a 2-week period, 1 week, and so forth, such that $t_{1-n} < t_1$.

(4) span: This feature represents a total time span over which a user is known to have visited the particular content delivery platform 130. In at least one implementation, the span feature is calculated as (most recent day−first day)+1. For instance, first day represents a date that a user was first detected as visiting the particular content delivery platform 130. The most recent day represents the most recent date that the user was detected as visiting the particular content delivery platform 130. As an example, consider that for a particular user first day is determined to be 5 Jan. 2018 and most recent day is determined to be 10 Sep. 2018. Accordingly, the value for span in this example would be 250 days, i.e., (249+1).

By configuring the revisit probability model 140 with these features, the revisit probability model 140 can be trained using the training set 142 to predict the probability that a particular user will visit the particular content delivery platform 130 on a particular date. The model features 302 described above, for example, represent the "feature columns" used to train the revisit probability model, and the "target column" is a revisit probability for a specific day.

Accordingly, in the center portion of the scenario 300, the training set 142 of the visit statistics 124 is used to train the revisit probability model 140. The training set 142 generally represents a portion of the visit statistics 124 of the user profiles 120 for a specific period of time. In one example, the training set 142 represents visit statistics 124 from the most recent 38 days, which represents 30 days for generating data values for the feature columns of the revisit probability model 140, plus 7 days for generating the data value of the target column, plus 1 day to account for data latency.

For instance, consider a scenario where the segment targeting system 102 is configured to predict the revisit probability for 15th November; that is, the probability that a particular user will visit a particular content delivery platform 130 on $15^{th}$ November. In this scenario, the training set 142 will include: visit statistics 124 from $7^{th}$ October to $6^{th}$ November for generating the feature columns; visit statistics 124 from $8^{th}$ November to $14^{th}$ November for generating the target column value; and for the target column value: if a user has consumed primary digital content 132 on the particular content delivery platform 130 from $8^{th}$ November to $14^{th}$ November then the revisit probability will equal 1, else 0.

After the revisit probability model 140 is trained, the scenario 300 proceeds to where the testing set 144 of the visit statistics 124 are input into the trained revisit probability model 140 to generate the revisit probability values 126. For instance, to predict a revisit probability value 126 for a particular day, the testing set 144 is selected as a set of visit statistics 124 over a particular period of time. Consider, for example, that the desired output is a revisit probability for the $15^{th}$ November. Accordingly, visit statistics are selected for 30 days prior to $15^{th}$ November, i.e., $15^{th}$ October to $14^{th}$ November. The visit statistics 124 for this time period are populated as the feature column values for the revisit probability model 140, which outputs the revisit probability values 126 for the $15^{th}$ November as the target column values.

Figure 4:
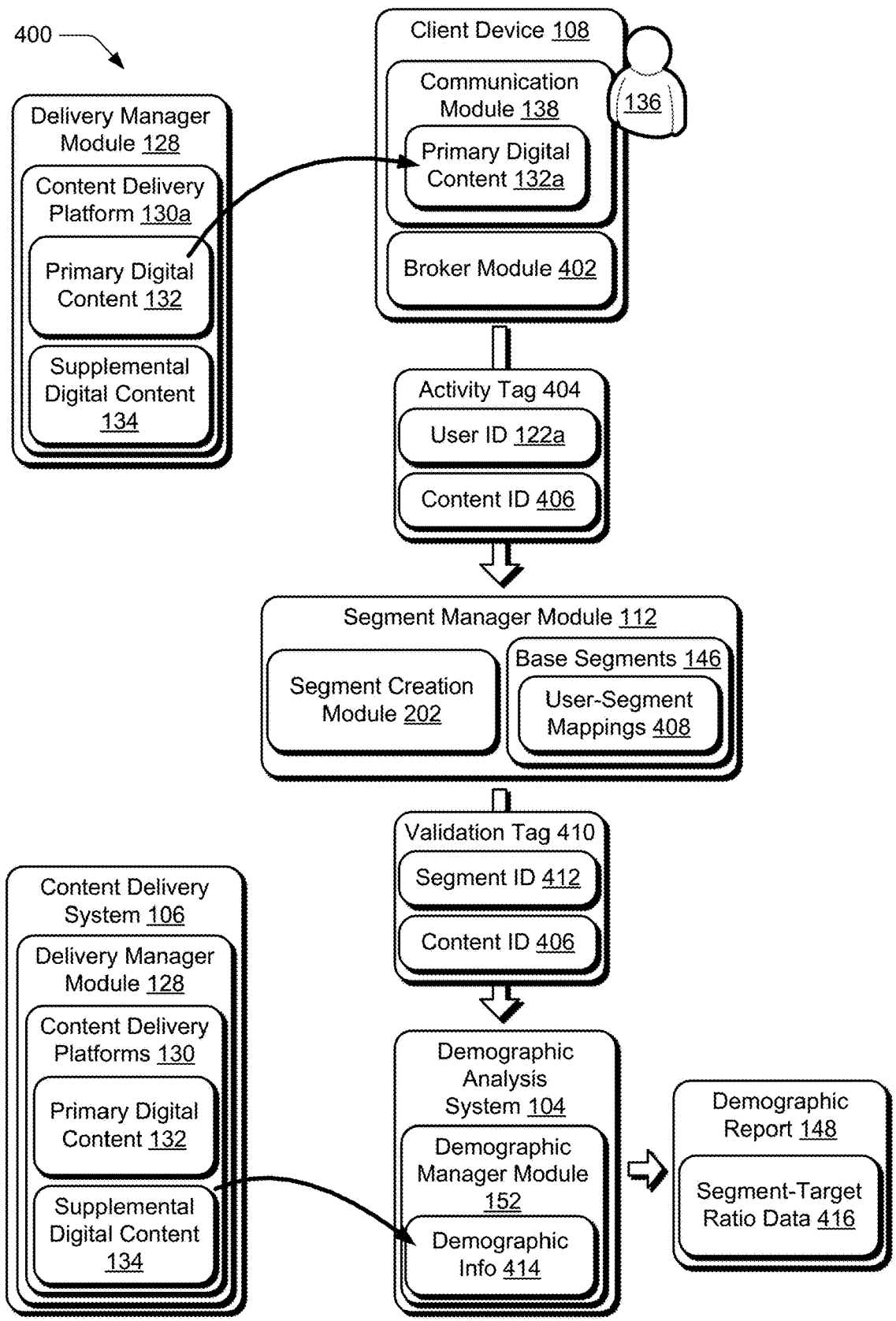
FIG. 4 depicts an example implementation scenario that describes a detailed way for obtaining demographic reports for base segments.

FIG. 4 depicts an example implementation scenario 400 that describes a detailed way for obtaining the demographic reports 148 for the base segments 146. As described previously, the demographic reports 148 describe demographic attributes of the individual base segments 146. In at least some implementations, the demographic reports 148 are generated by correlating user consumption of particular primary digital content 132 to demographic attributes of users known to consume the particular primary digital content 132.

In the upper portion of the scenario 400, the user 136 leverages the client device 108 to consume an instance of primary digital content 132a delivered by a content delivery platform 130a to the communication module 138. The primary digital content 132a, for example, represents a video that is displayed on the client device 108 by the communication module 138 based on a request from the user 136 to view the primary digital content 132a. In conjunction with the presentation of the primary digital content 132a on the client device 108, a broker module 402 of the client device 108 communicates an activity tag 404 to the segment manager module 112 of the segment targeting system 102. The broker module 402 is generally representative of functionality to enable the client device 108 to interact (e.g., exchange data) with the segment targeting system 102. The broker module 402, for instance, is configured to notify the segment targeting system 102 of content consumption activity that occurs on the client device 108.

The activity tag 404 includes a user ID 122a for the user 136 and a content ID 406 that identifies the instance of the primary digital content 132a. In response to receiving the activity tag 404, the segment manager module 112 parses the activity tag 404 to identify the user ID 122a and the content ID 406. The segment manager module 112 then searches user-segment mappings 408 with the user ID 122a to identify a user ID-segment ID mapping for the user ID 122a. Generally, the user-segment mappings 408 include data that maps individual user IDs 122 from the user profiles 120 to segment identifiers for respective base segments 146 into which the user profiles 120 are placed when the base segments 146 are generated. For instance, each base segment 146 includes a set of user IDs 122 that correspond to user profiles 120 that are clustered into the base segment 146. Accordingly, the user-segment mappings 408 identify a particular base segment 146 into which the user ID 122a for the user 136 was placed as part of generating the base segments 146.

Continuing with the scenario 400, the segment manager module 112 generates a validation tag 410 that includes a segment ID 412 from the user-segment mappings 408, and the content ID 406. In at least some implementations, the validation tag 410 does not identify an individual user (e.g., does not include the user ID 122a), but identifies, via the segment ID 412, a base segment 146 into which an individual user is placed. The segment manager module 112 then communicates the validation tag 410 to the demographic analysis system 104.

According to various implementations, the demographic analysis system 104 is configured to access demographic information ("info") 414 for users that view content via the content delivery platforms 130, and compile the demographic reports 148 based on this demographic info 414. For instance, the demographic info 414 indicates various demographic attributes of groups of users that consume the primary digital content 132. The demographic manager module 152 of the demographic analysis system 104 uses the demographic info 414 to ascertain the demographic makeup of groups of users that consume instances of the primary digital content 132, such as percentages of consumers that match different defined demographics. The demographic manager module 152 can correlate this information from the demographic info 414 to segment identifiers for users that consume the primary digital content 132a to determine a percentage of users in each base segment 146 that can be categorized into the particular demographic.

For instance, consider that in addition to receiving the validation tag 410 based on the content consumption behavior of the user 136, the demographic analysis system 104 receives many other validation tags indicating content consumption activities of many other users, such as for tens of thousands, hundreds of thousands, potentially millions of other users. In an example scenario, the demographic analysis system 104 receives 10,000 validation tags 410 that include the segment ID 412, and the demographic manager module 152 determines that 65% (6500) of those validation tags 410 are correlated with consumption of the primary digital content 132a. Further, the demographic manager module 152 maintains demographic info 414 that indicates that 60% of the users that consume the primary digital content 132a correspond to the demographic 204. Accordingly, the demographic manager module 152 determines that 39% (3900) of the segment ID 412 can be correlated to the demographic 204. This information is populated to the demographic report 148 as segment-target ratio data 416. The segment-target ratio data 416, for instance, includes the segment ID 412 and a percentage of users associated with the segment ID 412 that are categorized into the particular demographic 204.

According to various implementations, the segment-target ratio data 416 identifies multiple different base segments 146 and specifies different on-target ratios for the different base segments 146. For instance, the process described above with reference to the client device 108 and the activity tag 404 can be performed using many different client devices that are categorized into different base segments 146 to enable on-target ratios to be determined for the different base segments 146. These different on-target ratios are stored as the segment-target ratio data 416 in the demographic report 148. The demographic report 148 is then provided back to the segment targeting system 102 for use in generating the target segments 150.

Figure 5:
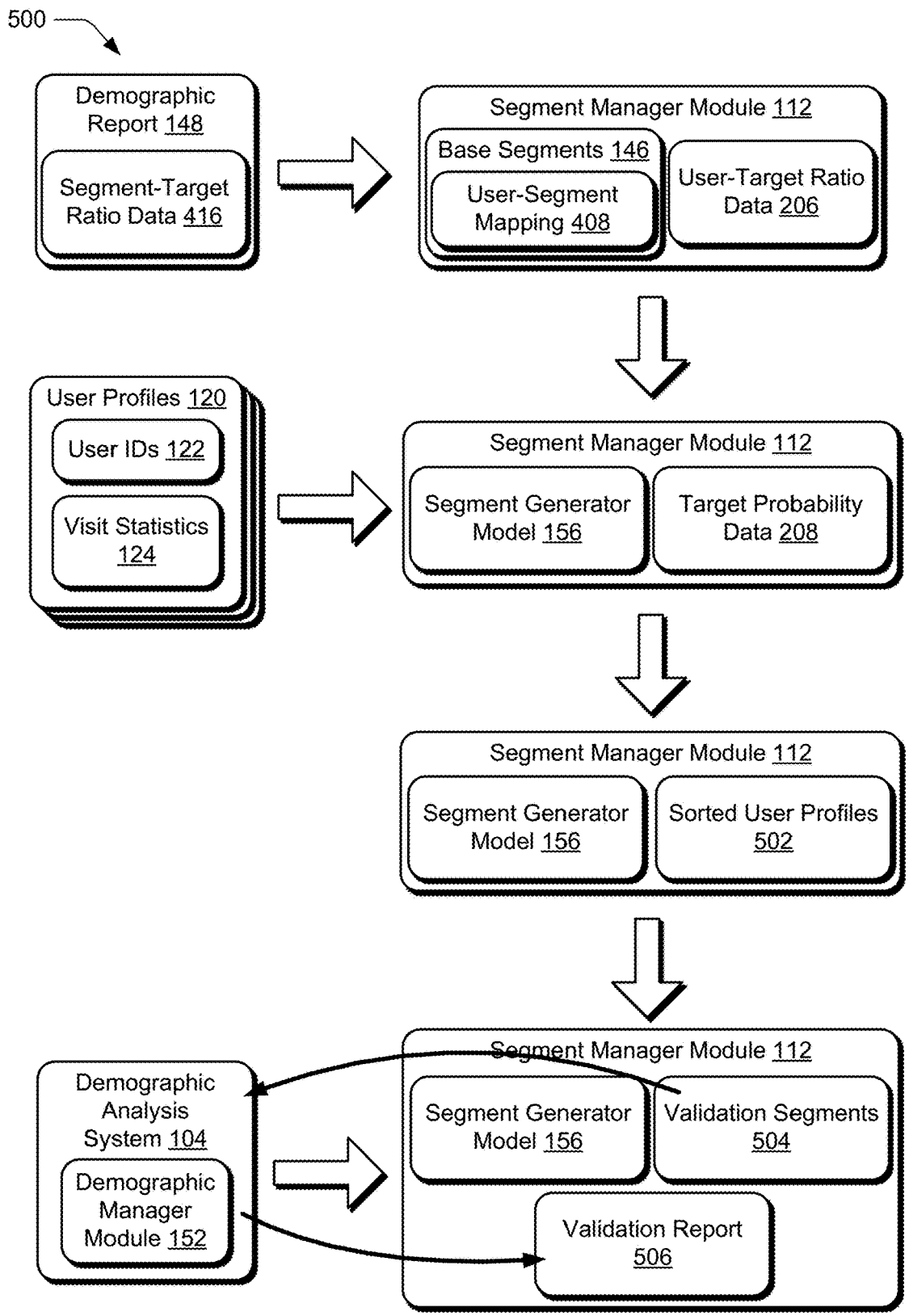
FIG. 5 depicts an implementation scenario for generating training data for training a machine learning model to predict on-target ratios for segments of users.

FIG. 5 depicts an implementation scenario 500 for generating training data for training a machine learning model to predict on-target ratios for segments of users. In the upper portion of the scenario 500, the segment manager module 112 receives the demographic report 148 with the segment-target ratio data 416. The segment manager module 112 then uses the segment-target ratio data 416 and a particular user-segment mapping 408 to generate the user-target ratio data 206. For instance, the segment identifiers from the segment-target ratio data 416 are mapped to corresponding segment identifiers in the user-segment mapping 408. Accordingly, each user in the user-segment mapping 408 can be assigned an on-target percentage for the user's respective base segment 146 based on the segment on-target ratios indicated in the segment-target ratio data 416.

For instance, consider further the example discussed above in the scenario 400 where 39% of the segment ID 412 was correlated to a particular demographic. Accordingly, users identified in the user-segment mapping 408 as being in the base segment 146 identified by the segment ID 412 are assigned an on-target ratio based on the on-target percentage for the particular base segment 146. By way of example, user profiles 120 are assigned on target ratios between 0 and 1, with 0 representing 0% of users being identified as categorized in the particular demographic, and 1 represent 100% of users being identified as categorized in the particular demographic. In this example, since 39% of the users in the base segment 146 associated with the segment ID 412 are indicated by the segment-target ratio data 416 as being correlated to the particular demographic, the individual user profiles 120 for the segment ID 412 are assigned an on-target ratio of 0.39 as part of the user-target ratio data 206.

Continuing with the scenario 500, the user-target ratio data 206 is used to train the segment generator model 156. As part of the training, individual instances of the user-target ratio data 206 are weighted to reduce the effect of noise introduced by imprecision in determining the exact correlation between base segments 146 and target demographics. For instance, when a particular base segment 146 is balanced such that 50% of users in the base segment are in a target demographic and 50% are not, user-target ratio data 206 for users in the base segment is weighted according to:

$$\text{Weight} = (2p-1)^2;$$

p=probability of being in class A; p corresponds to the on-target ratio for the base segment.

However, when a particular base segment 146 is not balanced, user-target ratio data 206 for users in the base segment is weighted based on the probability of being in a target demographic as being p' (p'!=0.5). Thus, user-target ratio data 206 for such base segments is weighted according to:

$$\text{Weight} = (p-p')/(1-p'); \text{ when } p \geq p'$$

$$(p'-p)/(p'-0); \text{ when } p < p'$$

Accordingly, after the segment generator model 156 is trained, the user profiles 120 are input into the trained segment generator model 156, which processes the user profiles 120 based on their respective visit statistics 124 to generate the target probability data 208. As mentioned previously, the target probability data 208 indicates a relative probability that each of the user profiles 120 is associated with a user that matches the demographic 204. For instance, for each user profile 120, the segment generator model 156 outputs a value from 0→1 indicating a probability that the user profile 120 matches the demographic 204, with 0 representing the least probability and 1 representing the highest probability.

The segment manager module 112 then sorts the target probability data 208 into sorted user profiles 502, which represents data that lists the user profiles 120 based on their relative probability of matching the demographic 204. In one example, the segment manager module 112 sorts the target probability data 208 in descending order of probability to generate the sorted user profiles 502. The sorted user profiles 502, for instance, list the user profiles 120 starting with the user profile 120 with the highest probability of matching the demographic 204, and then continues in decreasing order of probability.

In at least one implementation, the sorted user profiles 502 can be cooperatively validated via the demographic analysis system 104. To enable validation, the segment manager module 112 divides the user profiles 120 identified in the sorted user profiles 502 into validation segments 504. For instance, the segment manager module 112 divides the user profiles 120 from the sorted user profiles 502 into S segments by selecting approximately equal size portions of user profiles 120 from the sorted user profiles 502, e.g., 1% portions+/−0.2%. The segment manager module 112 then calculates an average probability for each validation segment 504 by averaging the probability values for the user profiles 120 in each validation segment. This provides the segment targeting system 102 with expected probabilities for each of the validation segments 504.

The segment targeting system 102 then submits the validation segments 504 to the demographic analysis system 104 to enable a validation demographic report ("validation report") 506 to be obtained. In at least one example, the demographic manager module 152 obtains the validation report 506 using a procedure as described above with reference to the scenario 400 for obtaining the demographic report 148. The validation report 506 specifies an on-target percentage for each of the validation segments 504, i.e., a percentage of user profiles 120 in each of the validation segments 504 that match the demographic 204. The on-target percentages can be compared to the previously-calculated expected probabilities for each of the validation segments 504 to ascertain the relative performance of the trained segment generator model 156. For instance, if the on-target percentages from the validation report 506 are within an expected range of variation (e.g., +/−5%) from the expected probabilities, the segment generator model 156 is determined to be providing accurate predictions of on-target percentages for users and/or segments of users.

Figure 6:
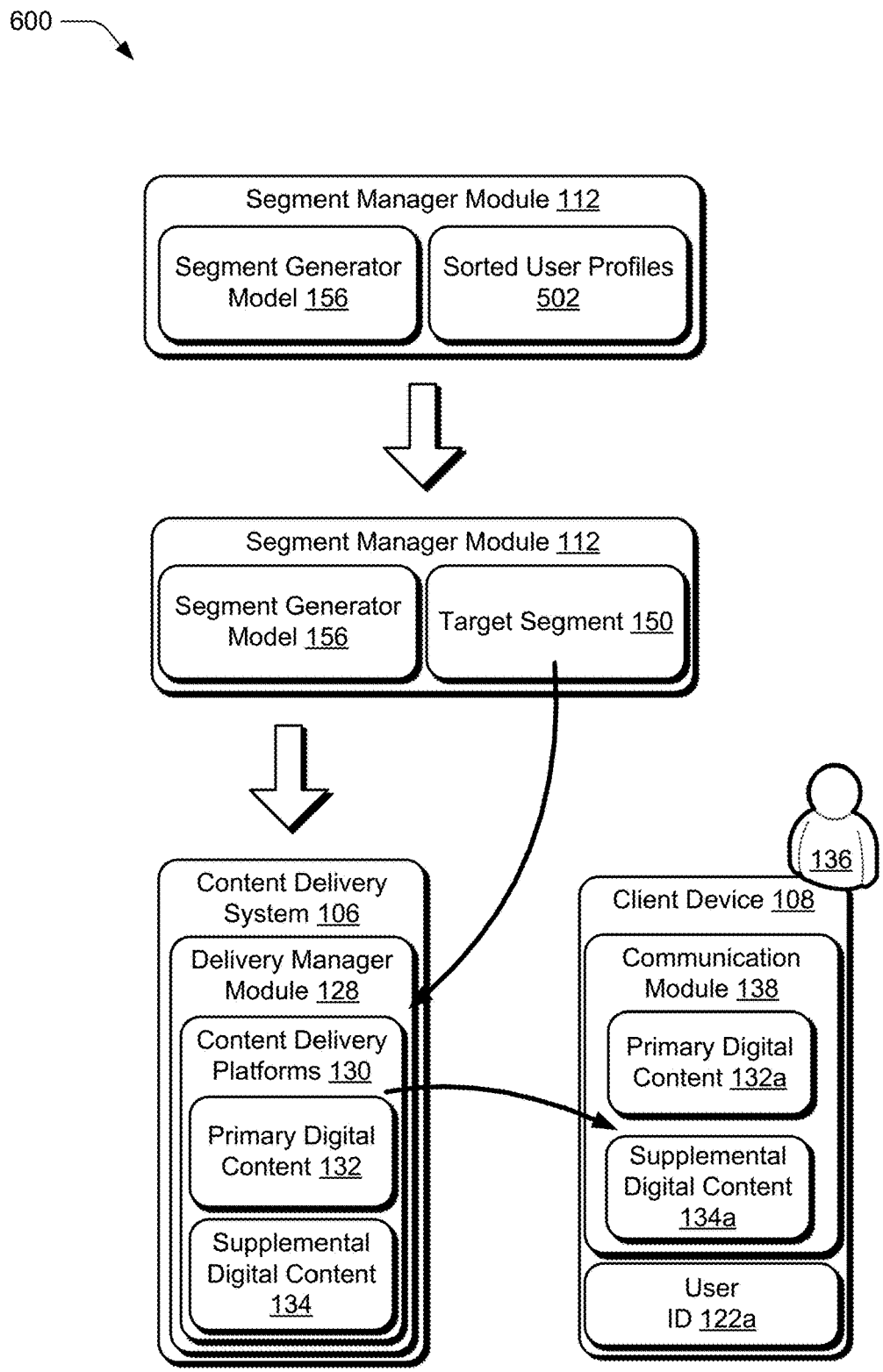
FIG. 6 depicts an implementation scenario for generating a target segment.

FIG. 6 depicts an implementation scenario 600 for generating the target segment 150. The scenario 600, for example, represents a continuation of the scenarios described above. In the scenario 600, the segment manager module 112 selects a portion of the user profiles 120 from the sorted user profiles 502 to generate the target segment 150. Generally, the segment manager module 112 selects those user profiles 120 from the sorted user profiles 502 that are determined to be most likely to match the demographic 204. For instance, consider that as discussed above, the sorted user profiles 502 are listed in descending order of decreasing probability of matching the demographic 204. Further, a particular delivery campaign for an instance of the supplemental digital content 134 has a target audience count of at users. Accordingly, the top at user profiles 120 are selected from the sorted user profiles 502 and used to generate the target segment 150.

Continuing with the scenario 600, the target segment 150 is provided to the content delivery system 106. Further, the user 136 is identified by the user ID 122a as being part of the target segment 150. Accordingly, an instance of supplemental digital content 134a that is targeted to the demographic 204 is delivered to the client device 108. For instance, consider that the user 136 is interacting with the client device 108 to consume the instance of the primary digital content 132a. While the primary digital content 132a is being played out by the communication module 138, the supplemental digital content 134a is transmitted (e.g., by the content delivery system 106) to the client device 108. For example, playback of the primary digital content 132a is paused and the supplemental digital content 134a is output by the communication module 138. After output of the supplemental digital content 134a is finished, playback of the primary digital content 132a may resume. This scenario is presented for purpose of example only, and it is to be appreciated that the supplemental digital content 134a may be output in a variety of different ways, and may not necessarily be linked to output of the primary digital content 132a.

According to implementations for machine learning-based generation of target segments, the scenarios described above can be performed for a variety of different demographics and for a variety of different instances of supplemental digital content. For example, different instances of the segment generator model 156 can be trained to predict matches between users and different demographics to enable target segments to be generated for a variety of different demographics.

Having discussed example details of the techniques for machine learning-based generation of target segments, consider now some example procedures to illustrate additional aspects of the techniques.

Example Procedures

This section describes example procedures for machine learning-based generation of target segments in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the segment targeting system 102 of FIG. 1 that makes use of the segment manager module 112 and using aspects described in the scenarios above.

Figure 7:
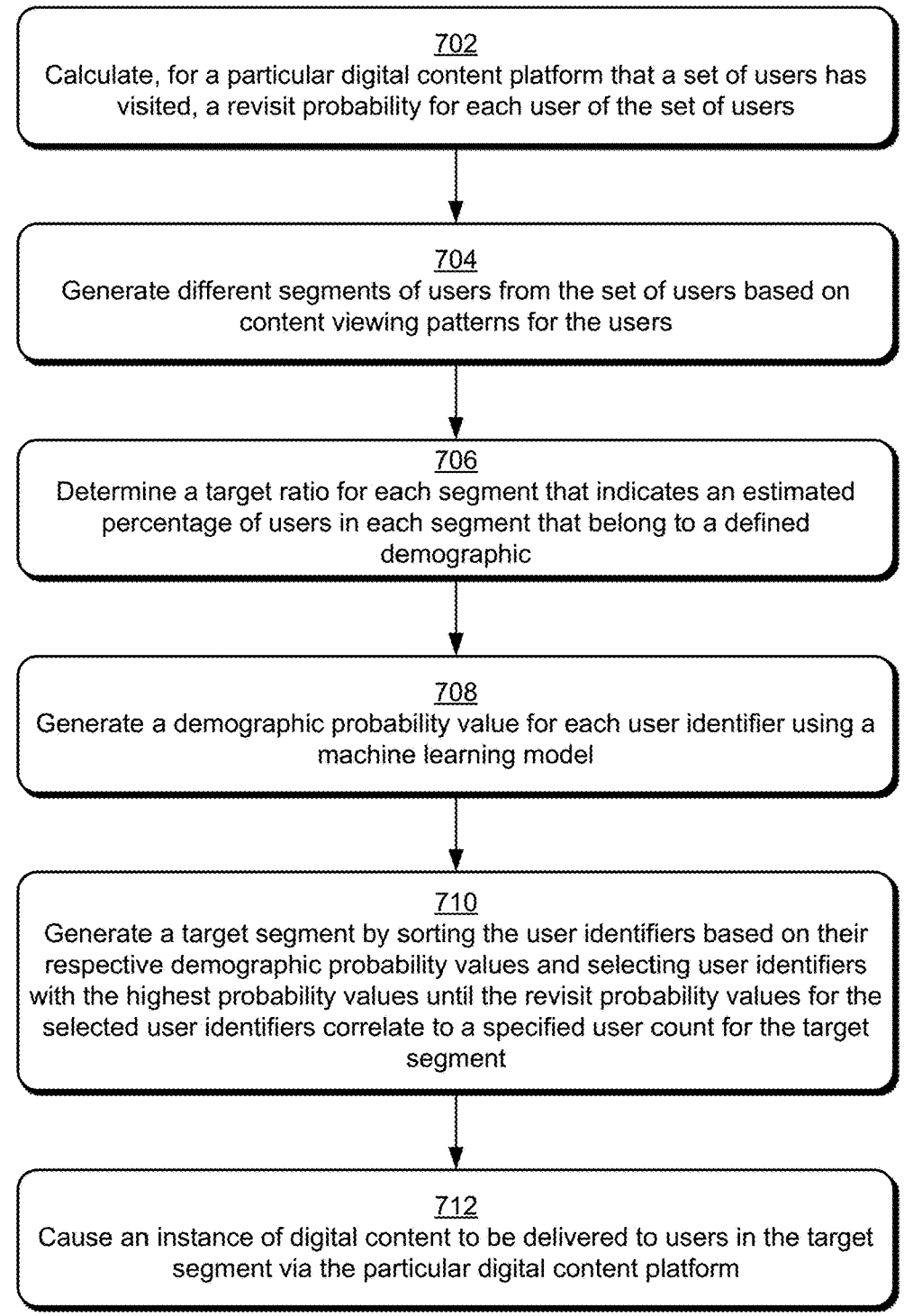
FIG. 7 depicts an example procedure for generating a target segment for content delivery.

FIG. 7 depicts an example procedure 700 for generating a target segment for content delivery. Step 702 calculates, for a particular digital content platform that a set of users has visited, a revisit probability for each user of the set of users. Generally, the revisit probability indicates a probability that each user will revisit the digital content platform. The segment manager module 112, for example, leverages the revisit probability model 140 to process the user profiles 120 and determine a probability that users identified in the user profiles will visit a particular content delivery platform 130. The segment manager module then associates a resulting revisit probability value with a user identifier for each user. One example way for calculating revisit probabilities is discussed above with reference to FIG. 3.

Step 704 generates different segments of users from the set of users based on content viewing patterns for the users. For instance, the segment manager module 112 generates the segments by determining content viewing patterns for the set of users on the digital content platform, comparing the content viewing patterns for each user of the set of users, and assigning user identifiers for users with similar content viewing patterns into common segments. According to one or more implementations, the segments are generated such that each segment includes user identifiers for users with a similar content viewing pattern, with each user identifier being correlated to a corresponding revisit probability value, such as calculated previously. An example way of generating segments of users based on content viewing patterns is described below with reference to FIG. 8.

Step 706 determines a target ratio for each segment that indicates an estimated percentage of users in each segment that belong to a defined demographic. In an implementation, the segment targeting system 102 determines the target ratio by obtaining a demographic report 148 for the segments that indicates a ratio of users in each segment that belong to the defined demographic, and for each segment assigning the ratio for the segment as the target ratio for each user identifier in the segment. The demographic report, for example, is obtained from a $3^{rd}$ party demographic service, such as the demographic analysis system 104. An example way for obtaining a demographic report is described above with reference to FIG. 4.

Step 708 generates a demographic probability value for each user identifier using a machine learning model. In an implementation, the segment manager module 112 trains the segment generator model 156 using training data that includes the user-target ratio data 206, and inputs the user profiles 120 into the trained segment generator model 156 to cause the segment generator model 156 to output demographic probability values for each of the user profiles 120. Generally, the probability values each indicate a probability that a respective user identifier 122 belongs to the defined demographic.

Step 710 generates a target segment by sorting the user identifiers based on their respective demographic probability values and selecting user identifiers with the highest demographic probability values until the revisit probability values for the selected user identifiers correlate to a specified user count for the target segment. The segment manager module 112, for example, sorts user identifiers 122 from the output from the segment generator model 156 in order (e.g., in descending order) of their respective probability values. The segment manager module 112 then selects user identifiers 122 with the highest probability values until the revisit probability values 126 for the selected user identifiers correlate to a specified user count for the target segment. The selected user identifiers are then stored as a target segment 150.

Step 712 causes an instance of digital content to be delivered to users in the target segment via the particular digital content platform. In an implementation, the segment targeting system 102 communicates a target segment 150 to a particular content delivery platform 130. The content delivery platform 130 then delivers an instance of digital content to users identified in the target segment 150. For instance, consider that a particular instance of the supplemental digital content 134 is targeted to the particular demographic used to generate the target segment 150. Accordingly, when a user identified in the target segment 150 is detected as consuming an instance of primary digital content 132 via the content delivery platform 130, the content delivery platform 130 can deliver the instance of the supplemental digital content 134 to the user.

Figure 8:
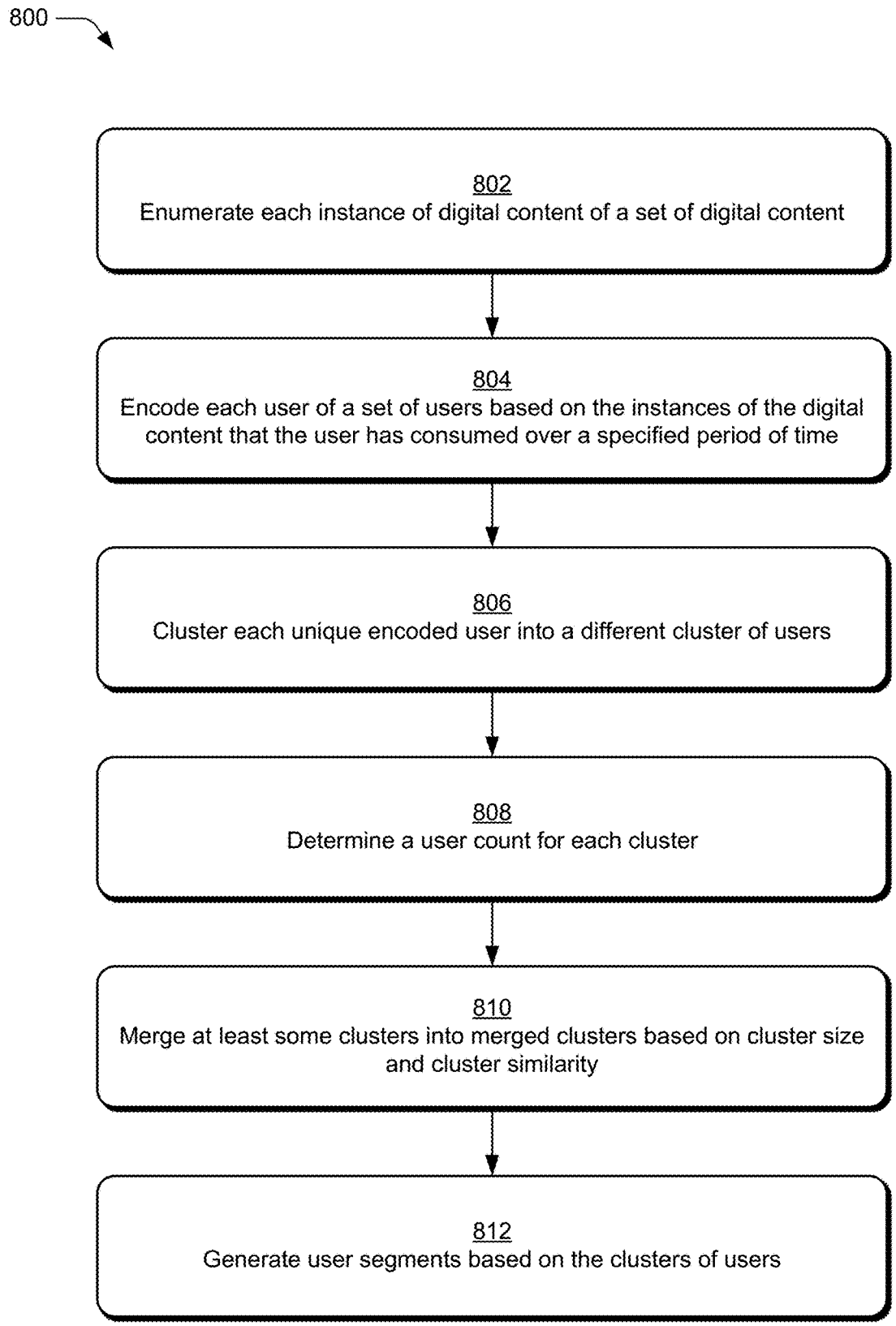
FIG. 8 depicts a procedure for generating segments of users.

FIG. 8 depicts an example procedure 800 for generating segments of users, such as for generating the base segments 146. The procedure, for example, describes an example way for performing step 704 of the procedure 700 discussed above.

Step 802 enumerates each instance of digital content of a set of digital content. For example, the segment manager module 112 assigns a different numeric value to different instances of primary digital content 132 that are published by a particular content delivery platform 130. In an implementation, the instances of primary digital content 132 represent different video content (e.g., different video series) that are delivered by the particular content delivery platform 130.

For instance, consider that a set of primary digital content 132 includes C different instances of primary digital content. Accordingly, each different instance of primary digital content can be assigned a different integer from $0 \rightarrow C$, e.g., content-0, content-1, content-2, . . . content-$N_{C-1}$.

Step 804 encodes each user of a set of users based on the instances of the digital content that the user has consumed over a specified period of time. The segment manager module 112, for example, bit-encodes different sets of primary digital content 132 that each user of the user profiles 120 has consumed over a period of time t as a parameter content_value. In an example implementation, the segment manager module uses one-hot encoding to encode the sets of primary digital content 132.

For instance, consider that we want to encode 5 different instances of primary digital content 132, which we enumerate as 0, 1, 2, 3, 4. Further, we represent each instance of content using 5 bits. A right-most bit represents content instance 0 while a left-most bit represents content instance 4. By default, all bits for a particular user are set to 0 (i.e., a user value of 00000), that is, assuming that we start with the value that a user hasn't consumed any content. When the user is detected as consuming a particular instance of content, the bit for that instance of content is flipped from 0 to 1.

As some examples:
User IDs 122 that have consumed content-0 and content-2 over t are assigned content_value of 00101, which is equivalent to 101.
User IDs 122 that have consumed content-1, content-2, and content-4 are assigned content_value of 10110.

Generally, this process continues for each user ID 122 until all combinations of instances of digital content are encoded.

Step 806 clusters each unique encoded user into a different cluster of users. For example, the segment manager module 112 assigns all user IDs 122 with the content_value of 101 into a first cluster, all user IDs 122 with the content value 10110 into a second cluster, and so forth until all of the different encoded instances of content_value are assigned into a different respective cluster.

Step 808 determines a user count for each cluster. The segment manager module 112, for instance, determines a cluster size for each cluster by counting a number of user IDs 122 assigned into each cluster.

Step 810 merges at least some clusters into merged clusters based on cluster size and cluster similarity. For instance, a cluster count threshold D is specified such that clusters that are generated above are merged until the number of clusters≤D. To merge the clusters, the segment manager module 112 starts with the smallest clusters and merges the clusters with their most similar clusters in terms of the similarity of their respective values for content_value.

In at least one implementation, cluster merging is performed using a k-means clustering algorithm to determine a distance between each cluster. For instance, consider that a cluster $\alpha$ is determined to be sufficiently small (e.g., is a smallest cluster) that it is to be merged with another cluster. Accordingly, by applying k-means clustering and determining a distance (e.g., a hamming distance) between the content_value of cluster $\alpha$ and the content_value for other clusters, it is determined that a different cluster $\delta$ is the smallest distance from cluster $\alpha$. In an example, distance=hamming distance between content_value (size_cluster $\alpha$+size_cluster $\delta$). Accordingly, cluster $\alpha$ and cluster $\delta$ are merged into a larger cluster ($\alpha$+$\delta$). Further details of this calculation:

Cluster $\alpha$ has a content_value of 1001 and has 5000 user IDs 122 with a sum of the revisit probability values for the cluster $\alpha$=400

Cluster $\delta$ has a content_value of 1101 and has 10,000 user IDs 122 with a sum of the revisit probability values for the cluster $\delta$=1000.

Accordingly, the hamming distance between the clusters $\alpha$, $\delta$=
(1001, 1101)(400+1000),
=1*1400,
=1400.

Thus, the cluster $\delta$ is determined to be the most similar to cluster $\alpha$, and thus the clusters are merged into a cluster ($\alpha$+$\delta$) that represents a particular base segment 146. This process continues until all of the user IDs 122 are clustered into different clusters, such as to generate a number of clusters that are within the cluster count threshold D.

Step 812 generates user segments based on the clusters of users. The segment manager module 112, for example, assigns each cluster $\alpha$ different segment identifier to generate different instances of the base segments 146.

Having described example procedures in accordance with one or more implementations, consider now an example system and device that can be utilized to implement the various techniques described herein.

Example System and Device

Figure 9:
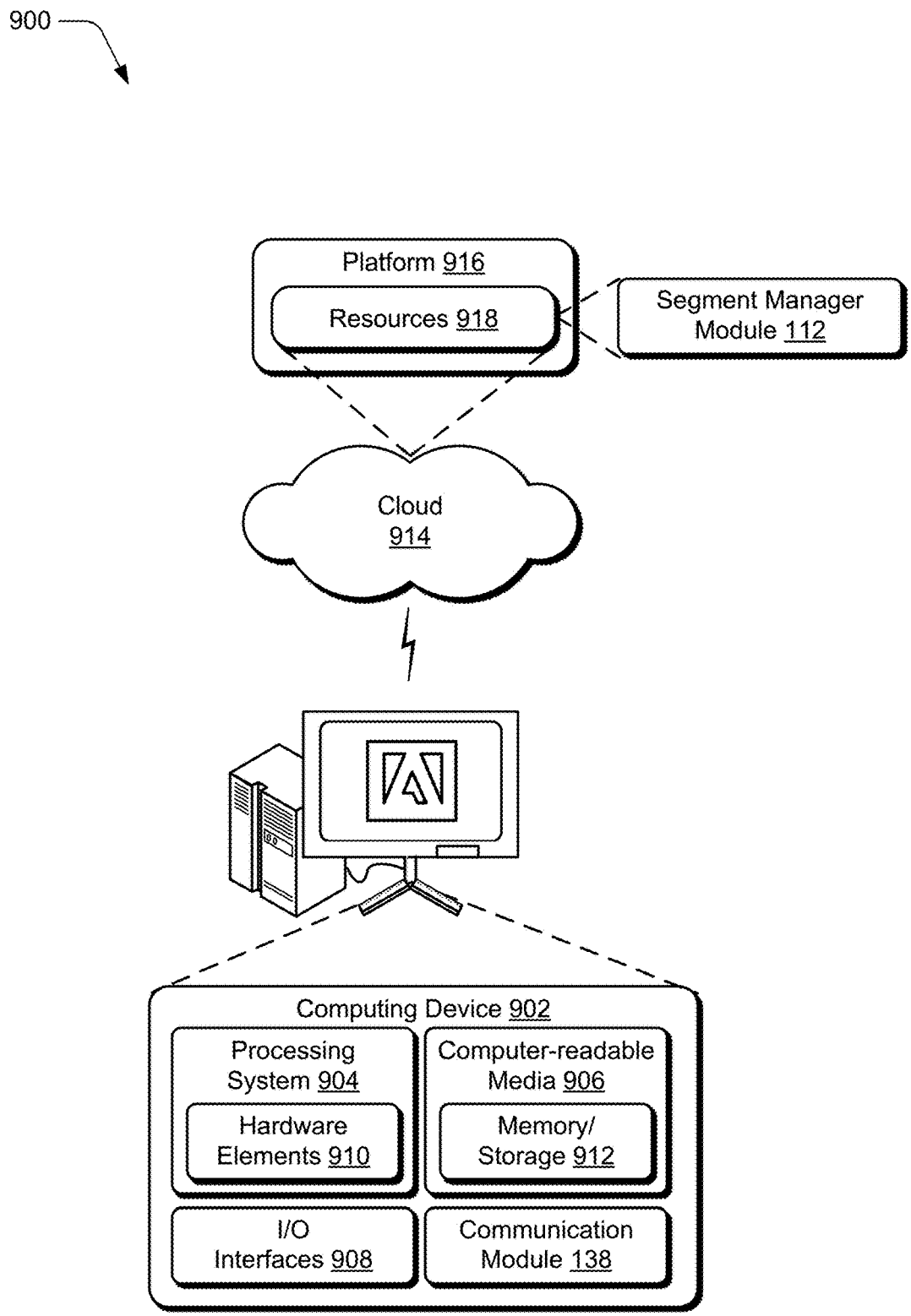
FIG. 9 illustrates an example system including various components of an example device that can be implemented as any type of computing device as described and/or utilized with reference to FIGS. 1-8 to implement aspects of the techniques described herein.

FIG. 9 illustrates an example system generally at 900 that includes an example computing device 902 that is representative of one or more computing systems and/or devices that may implement the various techniques described herein. This is illustrated through inclusion of the segment manager module 112 and the communication module 138. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Computer-readable storage media do not include signals per se or transitory signals. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment, a method implemented by at least one computing device, the method comprising:

calculating, by the at least one computing device and for a particular digital content platform that a set of users has visited, a revisit probability value for each user of the set of users using a revisit probability model configured with a set of model features, the revisit probability values indicating, for each user, a probability that the user will visit the digital content platform on a particular date, and associating a resulting revisit probability value with a user identifier for each user;

determining, by the at least one computing device, target ratios for segments of users that indicate an estimated percentage of users in each segment that belong to a defined demographic by obtaining a demographic report for the segments that indicates a ratio of users in each segment that belong to the defined demographic, and for each segment assigning the ratio for the segment as the target ratio for each user identifier in the segment;

training, by the at least one computing device, a machine learning model to predict a strength of correlation between the set of users and the defined demographic using the target ratios for the user identifiers as training data, the target ratios for the user identifiers weighted prior to being input to the machine learning model to reduce prediction errors;

transforming, by the at least one computing device, user data for the set of users into a demographic probability value for each user identifier by inputting the user data for the set of users to the machine learning model to generate each demographic probability value as indicating a probability that each user identifier belongs to the defined demographic;

generating, by the at least one computing device, a target segment by sorting the user identifiers based on their respective demographic probabilities and selecting user identifiers with a highest demographic probability values until the revisit probability values for the selected user identifiers correlate to a specified user count for the target segment;

validating, by the at least one computing device, the target segment by dividing the sorted user identifiers into validation segments and submitting the validation segments to a demographic analysis system to obtain a validation report specifying an on-target percentage for each of the respective validation segments; and transmitting, by the at least one computing device, an instance of digital content to respective client devices of users in the validated target segment via a network.

2. A method as described in claim 1, wherein the specified user count is based on the revisit probability values for users in the target segment.

3. A method as described in claim 1, wherein a number of users placed into each segment is based at least in part on a sum of the revisit probability values for the users in each segment.

4. A method as described in claim 1, wherein said obtaining the demographic report comprises:

generating, by the at least one computing device, the segments of users from the set of users by determining content viewing patterns for the set of users on the digital content platform, comparing the content viewing patterns for each user of the set of users, and assigning user identifiers for users with similar content viewing patterns into common segments such that each segment includes user identifiers for users with a similar content viewing pattern, and clustering the user identifiers into different segments that are sized based on the revisit probability values for user identifiers in each segment;

submitting, by the at least one computing device, the segments of users to a demographic analysis system that monitors content viewing statistics for the particular digital content platform; and receiving, by the at least one computing device, the demographic report from the demographics analysis system.

5. A method as described in claim 1, wherein said sorting the user identifiers comprises sorting the user identifiers in descending order of decreasing demographic probability, and wherein said selecting comprises selecting the user identifiers in descending order until the selected user identifiers correlate to the specified user count for the target segment.

6. A method as described in claim 1, wherein the instance of digital content comprises an instance of supplemental digital content that is delivered to one or more of the users in the validated target segment supplementary to an instance of primary digital content delivered to the one or more users.

7. A method as described in claim 6, wherein the instance of supplemental digital content comprises one or more of an advertisement, a public service announcement, or informational content related to the instance of primary digital content.

8. A method as described in claim 1, wherein the transmitting the instance of digital content to respective client devices of users in the validated target segment includes transmitting the validated target segment to a digital content platform to enable the digital content platform to deliver the instance of digital content to users identified in the validated target segment.

9. In a digital medium environment, a method implemented by at least one computing device, the method comprising:

calculating, by the at least one computing device and for a particular digital content platform that a set of users has visited, a revisit probability value for each user of the set of users, the revisit probability values indicating, for each user, a probability that the user will visit the digital content platform on a particular date the calculating including:

configuring, by the at least one computing device, a revisit probability model with a set of model features, the set of model features representing temporal variables that the revisit probability model is configured to evaluate to generate output;

training, by the at least one computing device, the revisit probability model with a training set of visit statistics for the set of users; and inputting a testing set of the visit statistics to the trained revisit probability model to cause the revisit probability model to output revisit probability values for the set of users, and associating a resulting revisit probability value with a user identifier for each user;

generating, by the at least one computing device, different segments of users from the set of users by determining content viewing patterns for the set of users on the digital content platform, comparing the content viewing patterns for each user of the set of users, and assigning user identifiers for users with similar content viewing patterns into common segments such that each segment includes user identifiers for users with a similar content viewing pattern, each user identifier being correlated to a corresponding revisit probability value;

determining, by the at least one computing device, a target ratio for each segment that indicates an estimated percentage of users in each segment that belong to a defined demographic by obtaining a demographic report for the segments that indicates a ratio of users in each segment that belong to the defined demographic, and for each segment assigning the ratio for the segment as the target ratio for each user identifier in the segment;

training, by the at least one computing device, a machine learning model to predict a strength of correlation between the set of users and the defined demographic using the target ratios for the user identifiers as training data, the target ratios for the user identifiers weighted prior to being input to the machine learning model to reduce prediction errors;

transforming, by the at least one computing device, user data for the set of users into a demographic probability value for each user identifier by inputting the user data for the set of users to the machine learning model to generate each demographic probability value as indicating a probability that each user identifier belongs to the defined demographic;

generating, by the at least one computing device, a target segment by sorting the user identifiers based on their respective demographic probability values and selecting user identifiers with a highest demographic probability values until the revisit probability values for the selected user identifiers correlate to a specified user count for the target segment; and transmitting, by the at least one computing device, an instance of digital content to respective client devices of users in the target segment via a network.

10. A method as described in claim 9, wherein said calculating the revisit probability value for each user is based on visit statistics for the digital content platform for each user of the set of users over a specified period of time.

11. A method as described in claim 9, wherein said generating the segments of users comprises configuring a segment size for one or more of the segments of users based on a sum of the revisit probability values for the one or more of the segments of users.

12. A method as described in claim 9, wherein said generating the segments of users comprises clustering at least some users from the set of users into different clusters based on common content viewing patterns, and combining the different clusters into a single segment of the different segments based on a similarity in viewing patterns between the different clusters.

13. A method as described in claim 9, wherein said obtaining the demographic report comprises:

submitting, by the at least one computing device, identifiers for the segments of users to a $3^{rd}$ party demographic analysis system and without submitting identifiers for users within the segments; and receiving, by the at least one computing device, the demographic report from the demographic analysis system.

14. A method as described in claim 9, wherein said sorting comprises sorting the user identifiers into a group in descending order of decreasing demographic probability and selecting user identifiers from the group in descending order until the revisit probability values for the selected user identifiers correlate to a specified user count for the target segment.

15. A method as described in claim 9, wherein the set of model features includes:

a last visit feature generated by determining a length of time that has elapsed since a user last visited a particular content delivery platform;

a first visit start feature generated by determining a sum of content durations for content consumed on the particular content delivery platform by a user over a time period;

a second visit start feature generated by determining a second sum of content durations for content consumed on the particular content delivery platform by a user over a second time period; and a span feature generated by determining a total time span over which a user is known to have visited the particular content delivery platform.

16. A system comprising:

a segment manager module implemented at least partially in hardware of at least one computing device and configured to generate a target segment of users for digital content delivery via a content delivery platform; and a machine learning model implemented at least partially in the hardware of the at least one computing device and configured to take as input user data for segments of users, the user data indicating content consumption behaviors for users in the segments of users, the machine learning model further configured to output a probability for each user of the segments of users that the user belongs to a demographic category, the segment manager module further configured to:

generate revisit probability values for the segments of users using a revisit probability model, the revisit probability values indicating, for each user, a probability that the user will visit the content delivery platform on a particular date;

generate the segments of users based on the revisit probability values and the content consumption behaviors for each user;

generate a validation tag for each user in the segment of users that includes a segment ID identifying the segment of users and a content ID identifying the content consumption behavior for the respective segment;

obtain a demographic report that indicates a probability that each segment of users belongs to the demographic category based on the validation tags;

train the machine learning model using on-target ratios as training data, the on-target ratios weighted prior to being input to the machine learning model and indicating an estimated percentage of users in the segment that match the demographic category;

generate the target segment of users based on demographic on-target probability for individual users output by the machine learning model to enable digital content to be delivered to the target segment of users via the content delivery platform.

17. A system as described in claim 16, wherein the segment manager module is configured to obtain the demographic report by submitting the segments of users to a $3^{rd}$ party demographic analysis system, and receiving the demographic report from the demographic analysis system.

18. A system as described in claim 16, wherein the segment manager module is further configured to validate the output from the machine learning model by submitting the output to a $3^{rd}$ party demographic analysis system, and to receive a validation report from the demographic analysis system that indicates a percentage of users from the output that match the demographic category.

19. A system as described in claim 16, wherein the segment manager module is configured to generate the target segment by: sorting users identified in the output from the machine learning model in descending order of decreasing demographic probability, and selecting users in descending order until the selected users correlate to a specified user count for the target segment.

20. A system as described in claim 16, wherein the revisit probability model is configured with a set of model features, the model features including a sum of content durations for content consumed on the particular digital content platform by a user over a time period.

* * * * *

UNITED STATES PATENT AND TRADEMARK OFFICE
CERTIFICATE OF CORRECTION

| | | |
|---|---|---|
| PATENT NO. | : 11,538,051 B2 | Page 1 of 1 |
| APPLICATION NO. | : 16/168288 | |
| DATED | : December 27, 2022 | |
| INVENTOR(S) | : Praveen Kumar Goyal et al. | |

It is certified that error appears in the above-identified patent and that said Letters Patent is hereby corrected as shown below:

In the Claims

Column 28, Line 41, after "demographic category;", insert --and--.

Signed and Sealed this
Seventh Day of March, 2023

Katherine Kelly Vidal
*Director of the United States Patent and Trademark Office*